(12) United States Patent
Aijima

(10) Patent No.: US 8,052,910 B2
(45) Date of Patent: Nov. 8, 2011

(54) CONTINUOUS MOLDING METHOD OF COMPOSITE MATERIAL HAVING STEPWISE SECTIONAL THICKNESS

(75) Inventor: Masatoshi Aijima, Tokyo (JP)

(73) Assignee: Jamco Corporation, Tokyo (JP)

( * ) Notice: Subject to any disclaimer, the term of this patent is extended or adjusted under 35 U.S.C. 154(b) by 271 days.

(21) Appl. No.: 11/905,785

(22) Filed: Oct. 4, 2007

(65) Prior Publication Data

US 2008/0217806 A1 Sep. 11, 2008

(30) Foreign Application Priority Data

Mar. 5, 2007 (JP) ................................. 2007-054048

(51) Int. Cl.
*B29C 70/44* (2006.01)
(52) U.S. Cl. ......... 264/258; 264/135; 264/136; 264/137
(58) Field of Classification Search ............... 264/258, 264/135–137
See application file for complete search history.

(56) References Cited

U.S. PATENT DOCUMENTS

| | | | | |
|---|---|---|---|---|
| 3,684,622 A | * | 8/1972 | Goldsworthy | 156/441 |
| 3,960,629 A | * | 6/1976 | Goldsworthy | 156/180 |
| 3,992,240 A | * | 11/1976 | Kuehn, Jr. | 156/250 |
| 4,012,267 A | * | 3/1977 | Klein | 156/178 |
| 4,110,147 A | * | 8/1978 | Grunwald et al. | 156/307.5 |
| 4,151,031 A | * | 4/1979 | Goad et al. | 156/201 |
| 4,362,588 A | | 12/1982 | Anton et al. | |
| 4,372,800 A | * | 2/1983 | Oizumi et al. | 156/307.3 |
| 4,659,425 A | * | 4/1987 | Eggers et al. | 216/20 |
| 4,842,667 A | * | 6/1989 | Thorsted, Jr. | 156/166 |
| 5,043,128 A | * | 8/1991 | Umeda | 264/258 |
| 5,114,516 A | * | 5/1992 | Pilling et al. | 156/180 |
| 5,132,070 A | * | 7/1992 | Paul et al. | 264/258 |
| 5,190,773 A | * | 3/1993 | Damon | 425/186 |
| 5,242,523 A | * | 9/1993 | Willden et al. | 156/285 |
| 5,336,526 A | * | 8/1994 | Spoo et al. | 427/372.2 |

(Continued)

FOREIGN PATENT DOCUMENTS

EP 1504880 A1 2/2005

(Continued)

OTHER PUBLICATIONS

European Search Report dated Jul. 4, 2008, issued in corresponding European Patent Application No. 07405292.9.

*Primary Examiner* — Yogendra Gupta
*Assistant Examiner* — Amjad Abraham
(74) *Attorney, Agent, or Firm* — Westerman, Hattori, Daniels & Adrian, LLP

(57) ABSTRACT

There is provided a continuous molding method capable of varying a thickness of a prepreg molded article.

A molding material 10 is prepared such that three plies, for example, of prepreg 31, 32, 33 are laminated with different end face positions on each face of a prepreg laminate 20 of a carbon fibre or the like, and prepreg peel plies 41, 42, 43 are arranged continuously to the respective plies of the prepreg 31, 32, 33. This molding material 10 is transformed into a sheet and continuously sent out to a hot press for molding, which is then heated in a post-curing oven for a prescribed period of time for thermosetting. After the molding, the prepreg peel ply 40 is peeled and removed so that a product whose sectional thickness varies can be obtained.

15 Claims, 7 Drawing Sheets

10 MOLDING MATERIAL
20 LAMINATE OF PREPREG OF CARBON FIBRE OR THE LIKE
30 PREPREG
40 PREPREG PEEL PLY

U.S. PATENT DOCUMENTS

| | | | | |
|---|---|---|---|---|
| 5,843,266 A | * | 12/1998 | Greenwood | 156/276 |
| 6,017,484 A | * | 1/2000 | Hale | 264/510 |
| 6,033,510 A | * | 3/2000 | Farley | 156/180 |
| 2003/0037867 A1 | * | 2/2003 | Bersuch et al. | 156/245 |
| 2006/0272768 A1 | * | 12/2006 | Kitamura et al. | 156/244.11 |
| 2009/0008836 A1 | * | 1/2009 | Kaps et al. | 264/511 |

FOREIGN PATENT DOCUMENTS

| | | |
|---|---|---|
| JP | 64-4315 A | 1/1989 |
| JP | 2-102029 A | 4/1990 |
| JP | 2001-191418 A | 7/2001 |
| WO | WO 2008/019894 A1 | 2/2008 |

* cited by examiner

10 MOLDING MATERIAL
20 LAMINATE OF PREPREG OF CARBON FIBRE OR THE LIKE
30 PREPREG
40 PREPREG PEEL PLY

CONTINUOUS MOLDING METHOD OF COMPOSITE MATERIAL HAVING STEPWISE SECTIONAL THICKNESS

The present application is based on and claims priority of Japanese patent application No. 2007-054048 filed on Mar. 5, 2007, the entire contents of which are hereby incorporated by reference.

BACKGROUND OF THE INVENTION

1. Field of the Invention

The present invention relates to a method for continuously molding a composite material by use of prepreg obtained by impregnating a thermosetting resin into a carbon fibre or the like. In this method, through the use of a prepreg peel ply with the resin impregnated therein, the composite material has uniform sectional thickness at the time of continuous molding, and the prepreg peel ply and/or an unnecessary portion of the prepreg are peeled and removed after curing so that the thickness of the composite material varies stepwise.

2. Description of the Related Art

Techniques for continuously molding a prepreg material are disclosed, for example, in Japanese Patent Laid-Open Publication No. 1-4315 (Patent Document 1), Japanese Patent Laid-Open Publication No. 2-102029 (Patent Document 2), and Japanese Patent Laid-Open Publication No. 2001-191418 (Patent Document 3).

The foregoing documents (Patent Documents 1 to 3) disclose molding of a member having a uniform sectional shape and uniform sectional thickness, but do not disclose molding of a member with its sectional shape and thickness varied.

SUMMARY OF THE INVENTION

The present invention is directed to providing a method for continuously molding a composite material. In this method, through use of a prepreg peel ply with the resin impregnated therein, the composite material has a uniform sectional shape and thickness at the time of continuous molding, and the prepreg peel ply and/or an unnecessary portion of the prepreg are peeled and removed after curing so that the thickness of the composite material varies stepwise.

A method for continuously molding prepreg according to the present invention includes a method for continuously molding a composite material having stepwise sectional thickness, which comprises the following steps as a basic means: preparing a molding material obtained by laminating, on a carrier film, composite material prepreg and a prepreg peel ply that is arranged continuously to the composite material prepreg; supplying the molding material on the surface of a multilayered composite material prepreg laminate, which is then passed through a mold and a post-curing oven; and peeling and removing the prepreg peel ply from the surface of the molded laminate.

Further, the prepreg peel ply has a substantially equal thickness to that of the prepreg and contains substantially the same resin as that in the prepreg.

Moreover, the prepreg and the prepreg peel ply are arranged in the longitudinal or width direction of the molding material.

According to the present invention, since a molding material has uniform thickness and can thus be cured in one molding step by a continuous molding device, and the prepreg peel ply and/or an unnecessary portion of the prepreg are peeled and removed after curing, it is possible to mold a composite material having stepwise sectional thickness. By such a molding method, it is possible to mold a homogeneous member without defects such as fibre disturbance and voids.

Compared with a method of bonding a member having uniform thickness as molded and cured to another member to increase the thickness or a method of additionally laminating uncured prepreg on a cured member and curing the obtained member to increase the thickness, according to the present invention, the composite material has no interface of a bonding portion or an additionally laminated portion. It is therefore possible to produce a member having high static strength and high fatigue strength.

According to the present invention, since an area where the thickness is varied is determined depending upon a butting position of the prepreg peel ply and the prepreg, a thickness varying step may be set at the time of rolling up the prepreg peel ply and the prepreg. Hence a mold formed so as to match a shape of an individual member, and the like, is not necessary, allowing free molding of a member having a desired shape. It is thus possible to freely produce long members having a variety of shapes with varying thickness, for example, in the longitudinal direction without a change in molding device.

DETAILED DESCRIPTION OF THE PREFERRED EMBODIMENTS

FIGS. 1 to 4 are explanatory views showing a basic molding method of the present invention.

Figure 1:
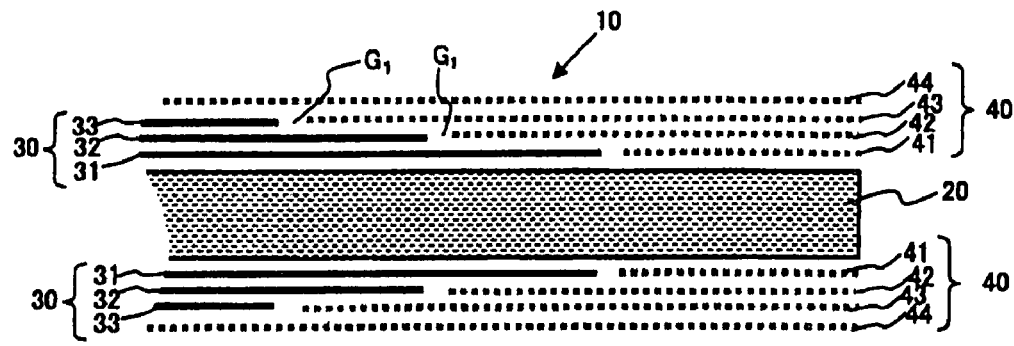
FIG. 1 is an explanatory view showing a sectional structure of a molding material to be prepared for a method for continuously molding a composite material having stepwise sectional thickness according to the present invention.

FIG. 1 is an explanatory view showing a sectional structure of a molding material to be prepared for a method for continuously molding a composite material having stepwise sectional thickness according to the present invention.

A molding material whose entire figure is shown by numeral 10 is prepared by laminating three plies of prepreg 31, 32, 33 on each face of a prepreg laminate 20 containing a carbon fibre or the like so that a thickness of the laminate is partially varied by a total of six plies of the prepreg on both faces. Although three layers of the prepreg whose sectional thickness varies are provided on one face in this figure, the number of layers is not limited to three but may be an arbitrary number.

The plies of the prepreg 31, 32, 33 are laminated with the respective ends thereof displaced by one ply. Subsequently, on the laminate 20 of the prepreg, prepreg peel plies 41, 42, 43 are laminated continuously to the ends of the respective plies of the prepreg 31, 32, 33.

The prepreg peel ply represented by numeral 40 has a characteristic of being easily peeled from a molding material by a mechanical means even after the composite material having a desired sectional shape was continuously molded by heating and pressurizing of a molding material.

Figure 2:
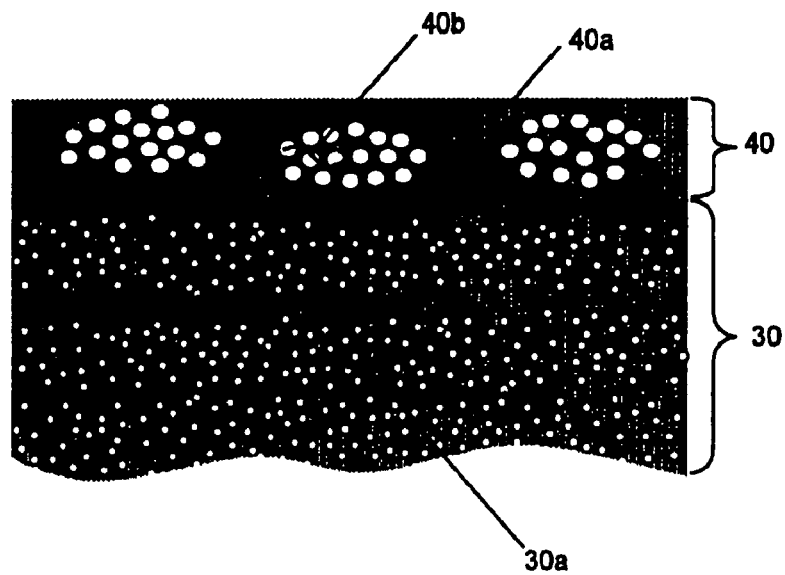
FIG. 2 is an explanatory view showing a schema of a sectional structure which represents a laminated state of a prepreg peel ply and prepreg.

FIG. 2 is an explanatory view showing a schema of a sectional structure where a prepreg peel ply 40 and a plurality of layers of prepreg 30 containing the carbon fibre or the like are laminated.

The prepreg peel ply 40 is obtained by impregnating a resin 40a into a fabric of a fibre 40b such as polyester, and the fibre is typically has a diameter of approximately fifteen micrometers. Meanwhile, a fibre 30a contained in the prepreg such as a carbon fibre has a diameter of several micrometers. Therefore, even if the resins impregnated respectively in the prepreg peel ply and the prepreg are the same, a fibre diameter and fibre flexibility are different therebetween, thereby facilitating peeling and removal of the prepreg peel ply after curing of the laminated structure.

The prepreg peel ply used in the present invention is obtained by impregnating a resin having the same or similar curing properties, especially the same or similar gelation properties, as or to that of prepreg as a member into, for example, a plain weave fabric of a fibre such as polyester or nylon. A resin content by volume ratio of the prepreg peel ply is desirably similar to that of the prepreg.

Commercially available prepreg containing a carbon fibre typically has a thickness of the order of 0.1 to 0.35 mm after curing. The thickness of the prepreg peel ply after curing is also selected from this range, or the same resin as that in the prepreg is impregnated into a fibre fabric having an appropriate fibre area weight and it is thus easy to produce a prepreg peel ply having a thickness approximate to that of the prepreg.

In FIG. 1, the end of the prepreg peel ply 40 arranged continuously to each ply of the prepreg 30 may be butted to the end of the prepreg 30, but a space $G_1$ of the order of 0.5 to 1 mm may be formed.

Figure 3:
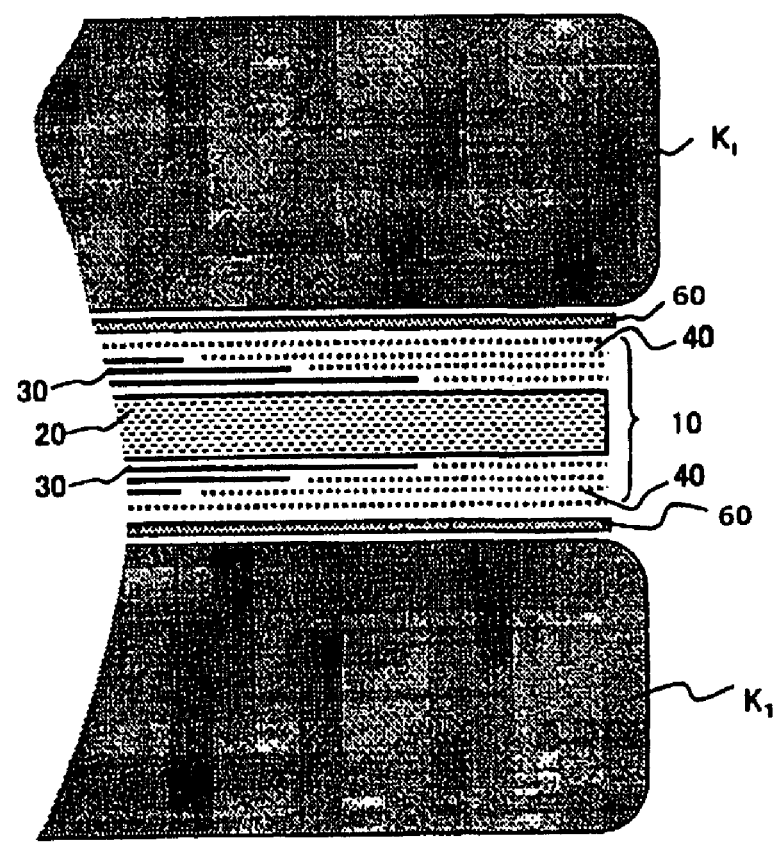
FIG. 3 is an explanatory view showing a step of making protective films sandwich both faces of a molding material and heating and pressurizing the molding material by means of a pair of molds, to perform a molding process.

FIG. 3 shows a step of making protective films 50 sandwich both faces of this molding material 10 and heating and pressurizing the molding material 10 by means of a pair of molds $K_1$, to perform a molding process.

Since the molding material 10 has a uniform thickness, uniform pressure is applied by the molds $K_1$ so that a favorable composite material can be molded.

Figure 4:
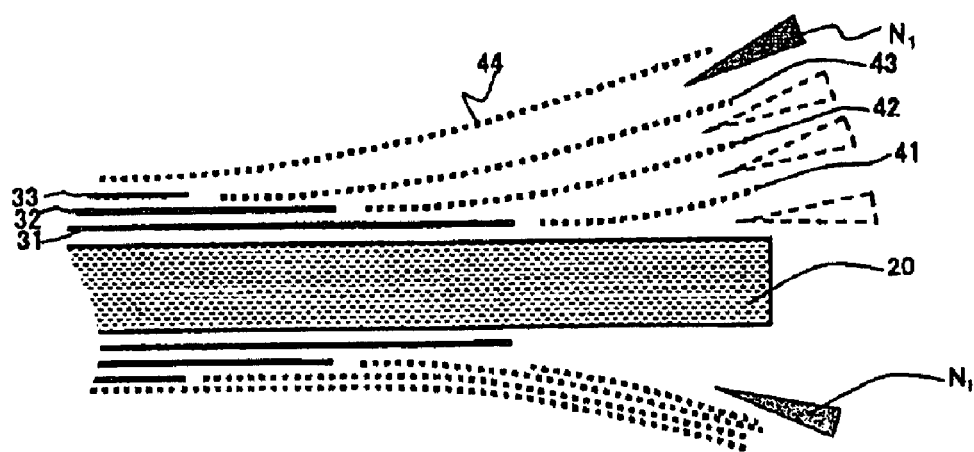
FIG. 4 is an explanatory view showing a step of peeling and removing the prepreg peel ply from the surface of the molded article.

FIG. 4 shows a step of peeling and removing prepreg peel plies 41, 42, 43, 44 from the surface of the molded article. These prepreg peel plies can be easily peeled and removed from the surface of the molded article by use of a tool such as knife $N_1$.

Figure 5:
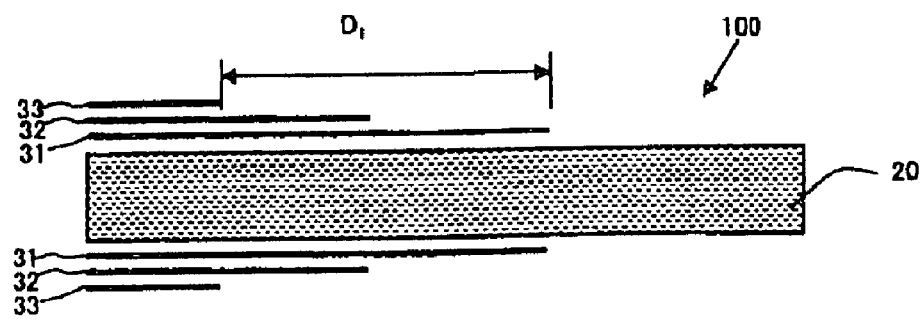
FIG. 5 is an explanatory view showing a structure of a product.

FIG. 5 schematically shows a structure of a molded article 100 molded in the foregoing process.

It is possible in the molded article 100 to vary stepwise the thickness in a region shown by symbol $D_1$ by displacing the ends of a total six plies of the prepreg 31, 32, 33 which are laminated on both faces of the laminate 20 of the prepreg as a center of the molded article 100.

Figure 6:
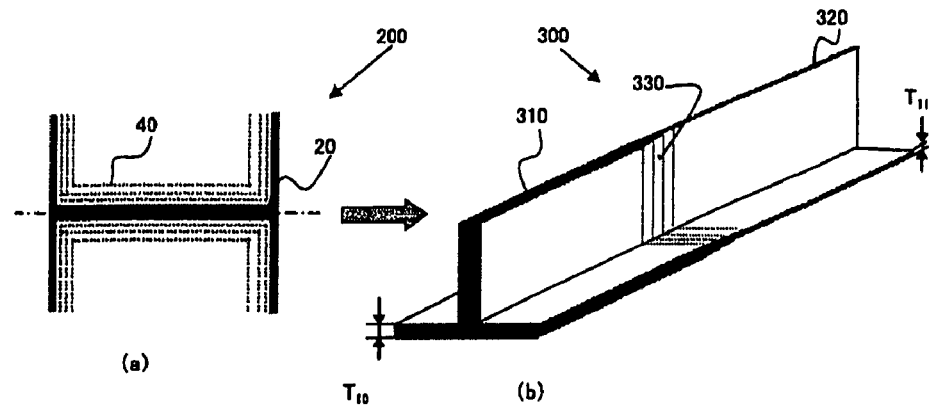
FIG. 6 is an explanatory view showing the structure of the product.

In FIG. 6, the foregoing means is used to mold an H-type member having a thickness that varies stepwise in the longitudinal direction, and the H-type member can be divided into halves to obtain a T-type member 300. In this T-type member 300, a structure can be obtained in which a rib 310 having a large thickness $T_{10}$ continues to a rib 320 having a small thickness $T_{11}$ through a step portion 330.

As for a molded article having such a structure, it is possible to reduce the weight while securing necessary strength.

Figure 7:
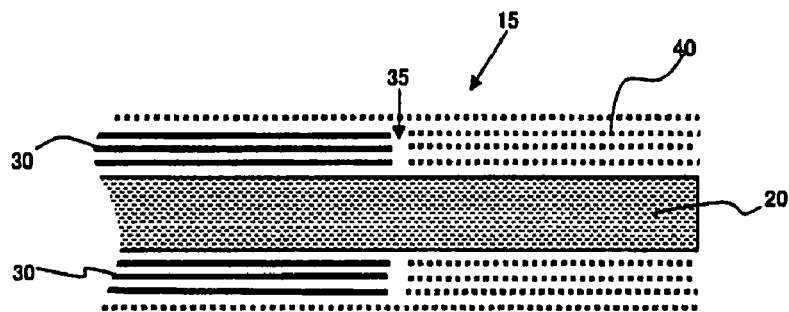
FIG. 7 is an explanatory view showing an example of a molding material in which the end positions of three plies of prepreg are aligned and the three piles are made opposed to the prepreg peel ply.

FIG. 7 shows an example of a molding material 15 in which the end positions of three plies of the prepreg 30 are aligned and the three piles are made opposed to the prepreg peel ply 40. Although three layers of the prepreg whose sectional thickness varies are provided on one face in this figure, the number of layers is not limited to three but may be an arbitrary number.

This molding material 15 is continuously molded and the prepreg peel ply 40 is peeled and removed so that a molded article having stepped portions 35 can be obtained.

Figure 8:
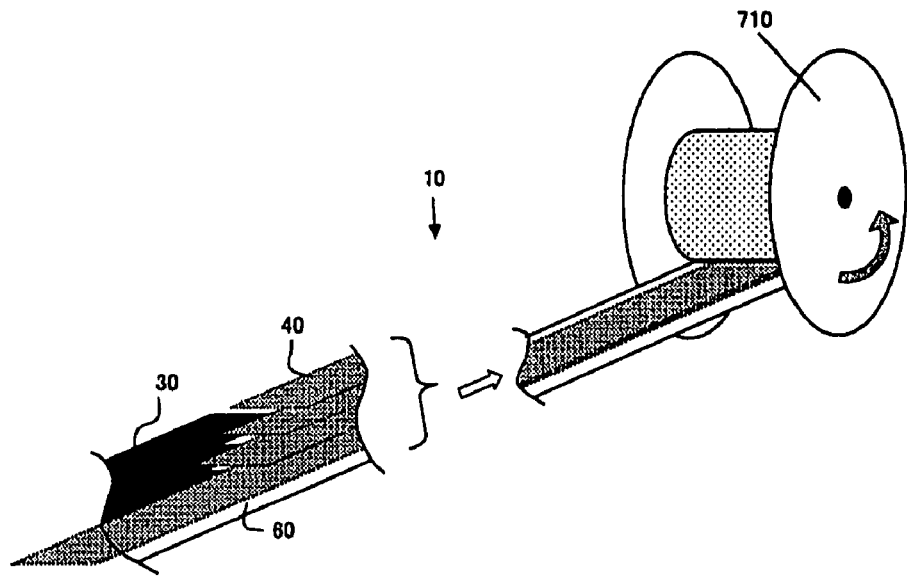
FIG. 8 is an explanatory view showing means of rolling up the molding material to a reel.
Figure 9:
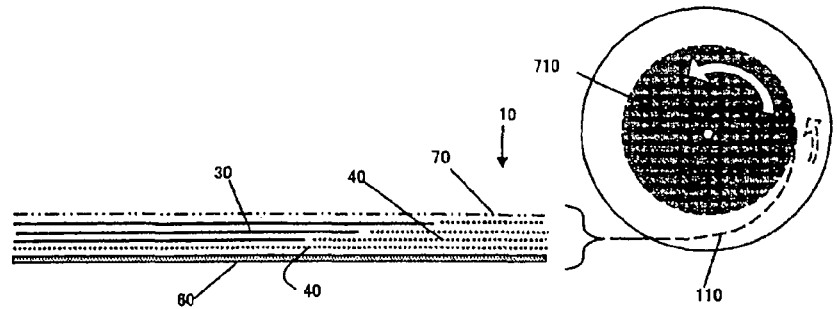
FIG. 9 is an explanatory view showing the means of rolling up the molding material on the reel.

FIGS. 8 and 9 show means of rolling up the molding material 10 on a reel 710.

In the molding material 10, the prepreg peel ply 40 and the prepreg 30 are laminated on a carrier film 60, and then rolled up on the reel 710 while being covered by a separator film 70.

Figure 10:
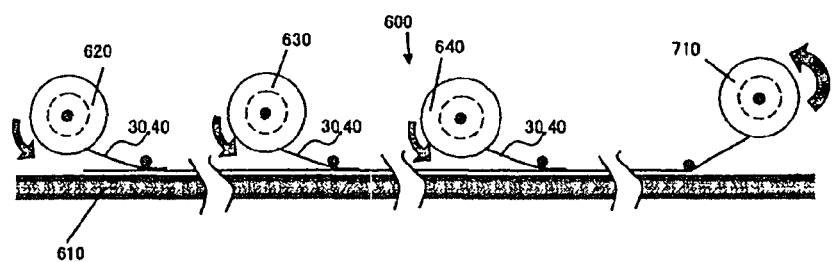
FIG. 10 is an explanatory view showing means of supplying the prepreg and the prepreg peel ply from a supply reel and then rolling up the prepreg and the prepreg peel ply on the reel side while sliding those on a base.

FIG. 10 shows means of supplying the prepreg 30 and the prepreg peel ply 40 from a supply reel 600 and then rolling up the prepreg 40 and the prepreg peel ply 40 on the reel 710 side while sliding those on a base 610.

Figure 11:
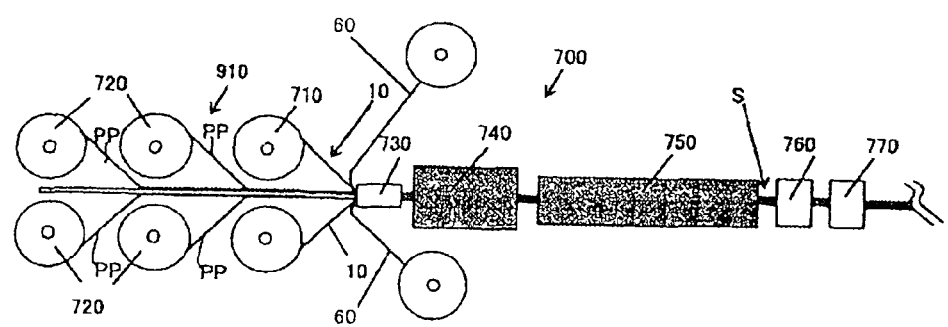
FIG. 11 is an explanatory view showing a device that performs continuous molding by using prepreg and the molding material of the present invention which are sent out from the supply reel.

FIG. 11 shows a device that performs continuous molding by using prepreg PP and the molding material 10 of the present invention which are sent out from the supply reel.

A continuous molding device 700 comprises a plurality of prepreg supply reels 720 and the reel 710 for supplying the molding material 10 of the present invention. The laminate is molded in a preforming mold 730 into an H-type or an L-type, and molded in a heating and pressurizing mold 740. The molded article is heated in a post-curing oven 750 for a set period of time, to complete curing of the thermosetting resin in the prepreg.

The continuously molded product is intermittently sent out through use of a fixing cramp 760 and a pulling cramp 770.

Figure 12:
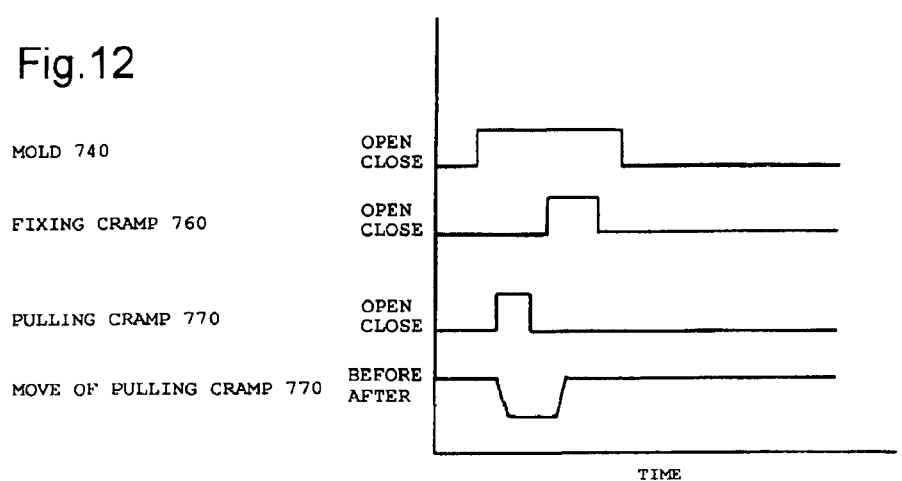
FIG. 12 is a timing chart showing opening/closing of a mold, opening/closing of a fixing cramp and activation of a pulling cramp.

FIG. 12 is a timing chart showing opening/closing of the mold 740, opening/closing of the fixing cramp 760 and activation of the pulling cramp 770.

Figure 13:
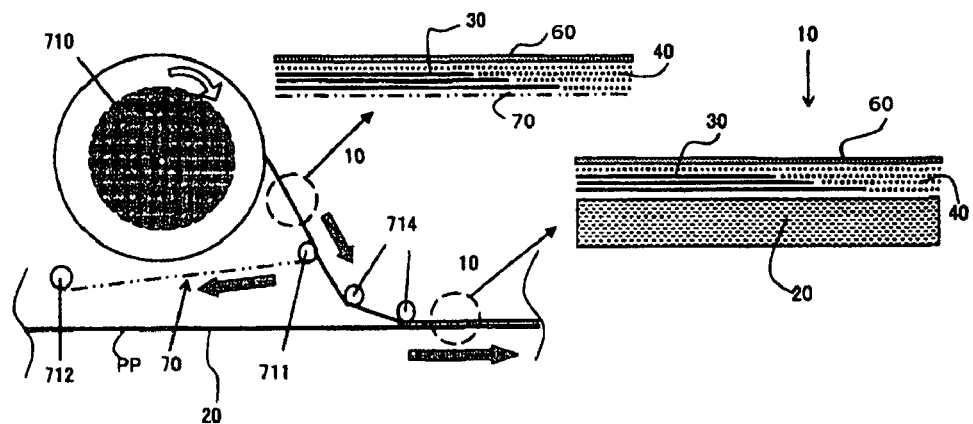
FIG. 13 is an explanatory view showing rollers for rolling up a separator film at the time of sending out the molding material from the reel and a step of laminating the molding material on the outermost layer of prepreg in which a plurality of layers of prepreg are laminated.

FIG. 13 shows rollers 711, 712 for rolling up the separator film 70 at the time of sending out the molding material 10 from the reel 710, and a step of laminating the molding material 10 on the outermost layer of the prepreg laminate 20 in which a plurality of layers of the prepreg PP are laminated.

Figure 14:
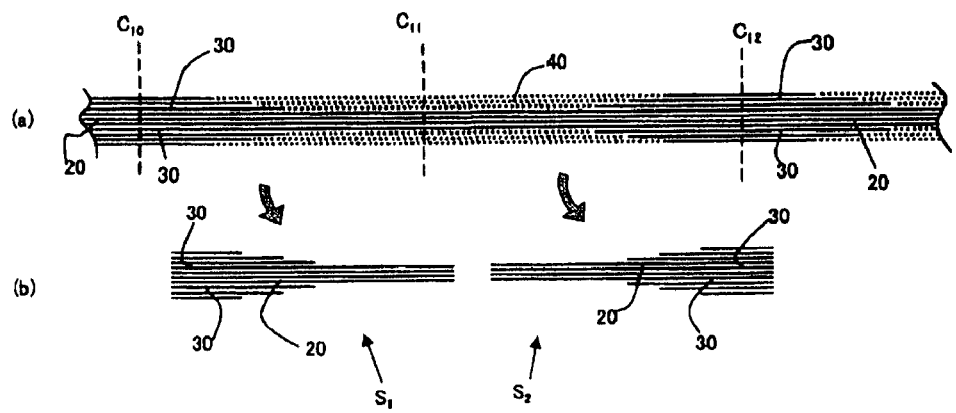
FIG. 14 is an explanatory view showing a structure of a product.

FIGS. 14A and 14B show that the molded article continuously molded by the foregoing means is cut at suitable places $C_{10}$, $C_{11}$, $C_{12}$ and the prepreg peel ply 40 is peeled and removed so that products $S_1$, $S_2$ can be obtained which have different thickness stepwise in the longitudinal direction.

It should be noted that, although the example of continuously molding products having thickness that vary in the longitudinal direction was shown in the foregoing example, a thickness in the width direction may also be varied.

Figure 15:
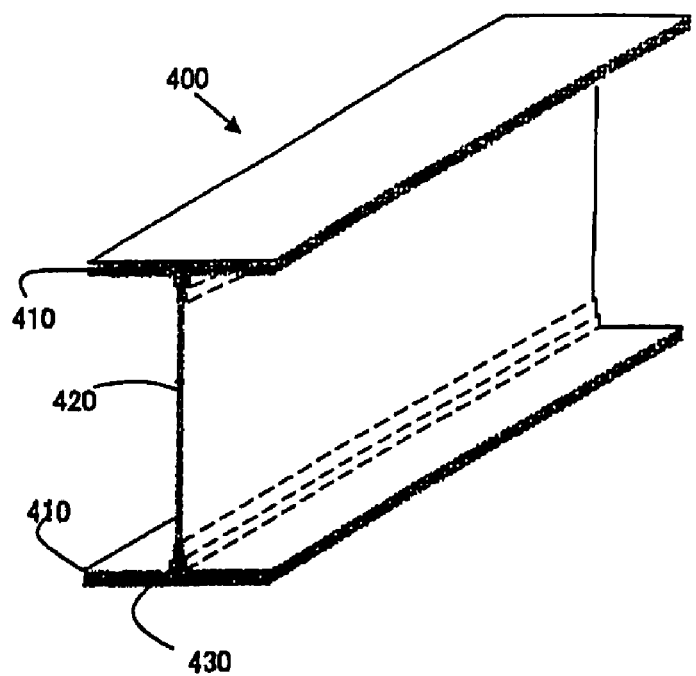
FIG. 15 is an explanatory view showing an H-type member.

FIG. 15 shows an H-type member 400. The H-type member 400 has a structure in which parallel flanges 410 are connected with each other through a web 420. In the H-type member 400 of the present invention, the thickness of the portion of the web 420 which is connected with the flange 410 is increased so as to improve rigidity of the H-type member 400. This member has an advantage of increasing its weight only to an extremely small extent.

Figure 16:
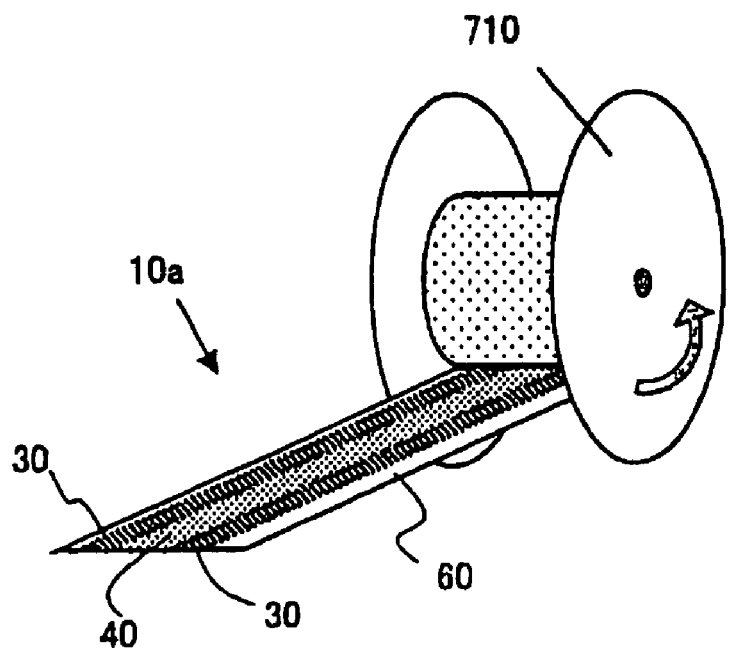
FIG. 16 is an explanatory view showing a molding material of the H-type member.

In this case, as shown in FIG. 16, a molding material 10a is rolled up on the reel 710 in a state where the prepreg 30 and the prepreg peel ply 40 are aligned in the width direction on the carrier film 60, and then supplied so that the H-type member 400 of FIG. 16 can be molded.

It is to be noted that the surface of a prepreg molded article can be covered by laminating glass-fibre containing prepreg thereon according to the intended use.

Further, thickness cpt per layer of prepreg or a prepreg peel ply after curing is obtained by the following calculation formula $$cpt=(mf/\delta f+mr/\delta r)\times 0.001 \text{ (mm)}$$

where
mf: fibre area weight (g/m$^2$)
$\delta f$: fibre density (g/cm$^3$)
mr: resin area weight (g/m$^2$)
$\delta r$: resin density (g/cm$^3$)

A prepreg peel ply having the same or approximate thickness as or to that of prepreg is calculated by the above calculation formula, and prepreg or a prepreg peel ply comprised of a fibre and a resin in appropriate combination may be selected or produced.

What is claimed is:

1. A method for continuously molding composite material prepreg having stepwise sectional thickness, in which composite material prepreg obtained by impregnating a thermosetting resin into a carbon fiber is intermittently supplied in the longitudinal direction and then passed through a mold and a curing oven, the method comprising the steps of:
preparing a molding material obtained by laminating, on a carrier film, composite material prepreg and a prepreg peel ply that is arranged continuously to the composite material prepreg in such a manner that a space, comprised within a range of 0.5 to 1 mm, is formed between the composite material prepreg and each end of the prepreg peel ply;
supplying the molding material on the surface of a multilayered composite material prepreg laminate, which is then passed through the mold and the curing oven; and
removing the carrier film from the surface of the molded laminate, then peeling and removing the prepreg peel ply from the surface of the molded laminate,
wherein the prepreg peel ply is obtained by impregnating a resin into a fabric of polyester fiber or nylon fiber,
the prepreg peel ply has a substantially equal thickness to that of the composite material prepreg, and
the resin impregnated into the fabric is the same resin as that in the composite material prepreg.

2. The method for continuously molding composite material prepreg having stepwise sectional thickness according to claim 1, wherein the composite material prepreg and the prepreg peel ply are arranged in the longitudinal direction of the molding material so that a thickness varies in the longitudinal direction.

3. The method for continuously molding composite material prepreg having stepwise sectional thickness according to claim 1, wherein the composite material prepreg and the prepreg peel ply are arranged in the width direction of the molding material so that a thickness varies in the width direction.

4. The method for continuously molding composite material prepreg having stepwise sectional thickness according to claim 1, wherein the fabric is the polyester fiber.

5. The method for continuously molding composite material prepreg having stepwise sectional thickness according to claim 1, wherein the molding material is covered by between a separator film and the carrier film.

6. The method for continuously molding composite material prepreg having stepwise sectional thickness according to claim 1, wherein the fabric of the prepreg peel ply has a diameter of 15 micrometers.

7. The method for continuously molding composite material prepreg having stepwise sectional thickness according to claim 1, wherein prior to peeling and removing the prepreg peel ply from the surface of the molded laminate, the molded laminate is cut into multiple pieces.

8. A method for continuously molding composite material prepreg having stepwise sectional thickness, comprising:
wherein a plurality of composite material prepreg layers are impregnating a thermosetting resin into a carbon fiber and
wherein the plurality of composite material prepreg layers are intermittently supplied in the longitudinal direction;
preparing a molding material obtained by laminating on a carrier film the plurality of composite material prepreg layers and a plurality of prepreg peel ply layers,
wherein the plurality of prepreg peel ply layers are obtained by impregnating a resin into a fabric of polyester fiber or nylon fiber and the resin impregnated into the fabric is the same resin as in the plurality of composite material prepreg layers;
wherein each layer of the plurality of prepreg peel ply layers is arranged continuously with each corresponding layer of the plurality of composite material prepreg layers;
wherein a gap of 0.5 to 1 mm is formed between the plurality of composite material prepreg layers and the plurality of prepreg peel ply layers; and
wherein the plurality of prepreg peel ply layers have substantially equal thickness as the thickness of the plurality of composite material prepreg layers;
supplying the molding material on the surface of a multilayered composite material prepreg laminate, and then passing the multilayered composite material prepreg laminate through a mold and a curing oven to form a molded laminate;
removing the carrier film from the surface of the molded laminate, followed by peeling and removing a portion of the plurality of prepreg peel ply layers from the surface of the molded laminate.

9. The method for continuously molding composite material prepreg having stepwise sectional thickness according to claim 8, wherein the gap is formed at the same position for each layer of the plurality of composite material prepreg layers and the corresponding layer of the plurality of prepreg peel ply layers relative to the carrier film.

10. The method for continuously molding composite material prepreg having stepwise sectional thickness according to claim 8, wherein the gap of in each layer of the plurality of composite material prepreg layers and the corresponding plurality of prepreg peel ply layers is present in a different position in each layer from one layer to the next relative to the carrier film.

11. The method for continuously molding composite material prepreg having stepwise sectional thickness according to claim 8, wherein the removing of the portion of the plurality of prepreg peel ply layers, each of the portion of the plurality of prepreg peel ply layers is simultaneously removed.

12. The method for continuously molding composite material prepreg having stepwise sectional thickness according to claim 8, wherein the removing of the portion of the plurality prepreg peel ply layers, the portion of the plurality of prepreg peel ply layers for each layer is individually removed at different times.

13. The method for continuously molding composite material prepreg having stepwise sectional thickness according to claim 6, further comprising removing the separator film and then peeling and removing the prepreg peel ply from the surface of the molded laminate.

14. The method for continuously molding composite material prepreg having stepwise sectional thickness according to claim 8, wherein the fabric of each layer of the plurality prepreg peel ply has a diameter of 15 micrometers.

15. The method for continuously molding composite material prepreg having stepwise sectional thickness according to claim 8, wherein prior to peeling and removing the portion of the plurality of prepreg peel ply layers from the surface of the molded laminate, the molded laminate is cut into multiple pieces.

* * * * *